United States Patent Office 3,317,142
Patented May 2, 1967

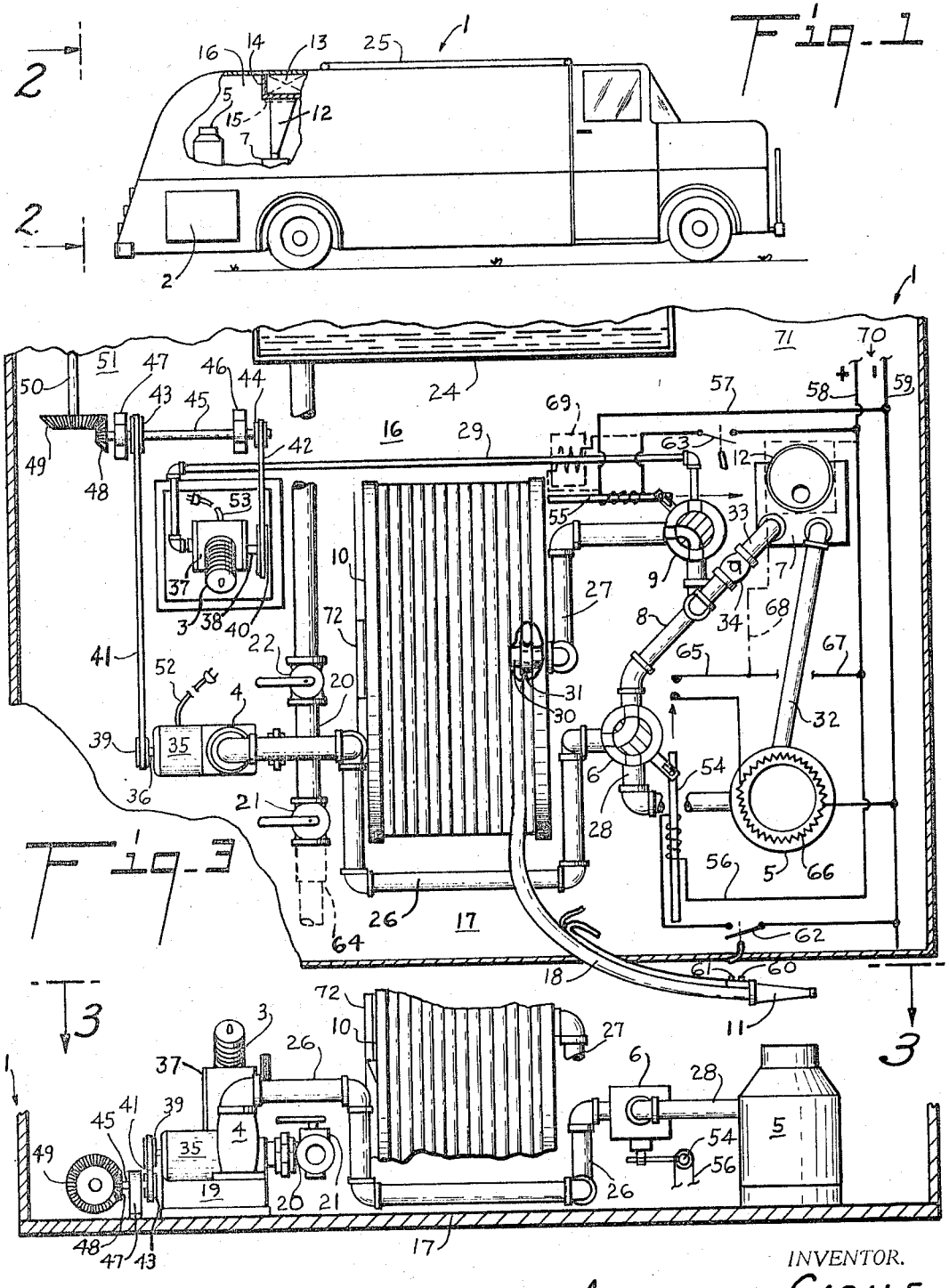

3,317,142
ON THE SPOT CAR WASH
Amerigo Casale, 2427 Glenn Haven,
Houston, Tex. 77025
Filed Apr. 25, 1966, Ser. No. 544,927
9 Claims. (Cl. 239—130)

This invention relates to an on the spot car wash or motor truck for transporting car wash equipment to cars to be washed, and washing the cars at location, selectively using water at atmospheric temperature, water heated and mixed with detergent, and compressed air, with selectivity being actuatable from the nozzle of the car washing hose; this application herein being a continuation-in-part application of application Ser. No. 400,708, filed Oct. 1, 1964, for On the Spot Car Wash, which describes the invention as relating to "a moveable car washer and improvements thereof."

This invention has the primary object of providing a motor truck equipped to wash cars on location, selectively, with atmospheric temperature tap water or water carried by the truck, with the water heated, and with compressed air, the principle object of the invention in the parent application having been that of washing "cars from a distance up to 200 feet without moving said car." Further objects having been stated as that of saving "time as far as the car owner is concerned" and as that of obviating leaving a "mess because troughs will be provided to catch the water as it runs off the car."

It is another and further object of the invention to provide an on the spot car wash motor truck equipped with car washing apparatus of this class, which may use tap water at location or carry the washing water on the truck; which may use electrical power at location or alternately supply the electrical power required; and which may optionally drive the compressor and pump from the power take-off of the motor truck.

Other and further objects will be apparent when the specification herein is considered in connection with the drawings, in which:

FIG. 1, which represented "the side view of the invention" in the parent application, is reproduced to smaller scale in this application, and is a right side elevation of a motor truck carrying equipment comprising an embodiment of the invention; the same reference numerals assigned in FIG. 1 of the parent application being applied to the same elements, and the view being shown part in section to show further apparatus within the truck;

FIG. 2, which represented "the rear view of the invention showing the component parts thereof" in the parent application, is a rear elevation to the same scale, the same reference numerals being assigned to elements as were assigned thereto in the parent application; the view being a rear view taken along line 2—2 of FIG. 1; and FIG. 3 is a plan view, part in section, and partially diagrammatic, taken along line 3—3 of FIG. 2; all elements shown in FIG. 2 of the parent application being shown in this view, with the same reference numerals applied; also additional elements, as drive mechanism and piping are shown; with additional electrical apparatus being shown diagrammatically.

The invention may be described in connection with FIGS. 1-3, inclusive, of the drawings, as follows:

The container 2, shown in FIG. 1, indicates diagrammatically and categorically, all of the accessory apparatus which may be carried on the truck 1 for use in the car washing operation. Described, as aforesaid, such may include a vacuum sweeper, ladders for use in washing vehicles of substantial height, buckets, chamois, brushes, wax, troughs, jacks and extra nozzles, as exemplary. Also, as the side of the truck is shown cut away in part, the hot water heater 5 and the detergent mixer 7 is shown, and also a funnel or hopper 12 for directing detergent from a box of detergent 13 in a rack 14 disposed in the top of the truck 1 above the detergent mixer 7. Also, a solenoid operated slide valve 15 is indicated in dotted lines in FIG. 1 as optional apparatus for controlling the delivery of detergent 13 into the hopper 12.

As hereinabove indicated, the apparatus employed in the operation is best mounted in the rear portion 16 of the motor truck 1 and supported by the truck bed 17. Primarily this apparatus comprises the pump 4, compressor 3; the hose reel 10 on which is reeled the hose 18 which terminates at the outer, or free end, in the nozzle 11.

The pump 4 is mounted on a base 19 and has its suction side connected to a water supply T 20 having a two-way valve 21 at the rear end thereof and a two-way valve 22 at the forward end thereof; the valve 22 being connected by a storage water conduit 23 to a water storage tank 24 which occupies the forward part of the rear end of the truck and which may be filled through its top as indicated by the reference numeral 25 in FIG. 1.

The pump 4 discharges into a discharge conduit 26 which passes from the left side of the reel 10 to the rear thereof and connects on the right side thereof centrally into a first three-way valve 27 between the connections thereinto of a water heater-first valve connecting conduit 28 to the water heater 5; and a valve connecting conduit 8 to the second three-way valve 9.

From the second three-way valve 9, a delivery conduit 27 extends from a position centrally between the connection thereinto of the conduit 8 and the connection thereinto of a compressor connecting conduit 29, the delivery conduit 27 connecting to the support of the reel 10 and extending into the reel axle 30; fluid thus delivered to pass through the axle 30 into a conventional hollow sleeve 31, anchored to the reel, and within which the axle 30 is sealably rotatable and to which the fixed or dead end of the hose 18 is connected to receive fluid thereinto from the sleeve 31. From the water heater 5, a water heater-detergent mixer connecting conduit 32 extends to the detergent mixer 7 shown in FIGS. 1 and 3; and from the detergent mixer 7 a connecting conduit 33 delivers a mixture of detergent and hot water through a check valve 34 (having valve element yieldably urged seated in direction of the mixer), to the valve connecting conduit 8.

The shaft 36 of the pump motor 35, and the shaft 38 of the compressor motor 37 have respective pulleys 39, 40 mounted on the outer ends thereof, and such pulleys are connected by respective belts 41, 42 to be driven by respective pulleys 43, 44 mounted on a jack shaft 45 which extends transversely across the truck bed 17, as journally supported above the truck bed by pillow blocks 46 and 47.

The outer end of the jack shaft 45 has a bevel pinion 48 thereon to mesh with a bevel gear 49 on the rear end of a power take-off shaft 50, which extends rearwardly down a passage 51 to the left of the water storage tank 24, the power take-off shaft 50 being journally supported by pillow blocks, not shown, and being conventionally connected forwardly to be driven by the engine of the motor truck 1 while the motor truck is not in motion. Optionally, the pump and compressor drive belts 41, 42 may be removed, and their respective motors 35, 37 may be connected to be driven from a source of electrical power, as by plugging in their respective electrical extension cords 52, 53.

The pump 4 may be started to take suction from the water storage tank 24, in which case the valve 21 is closed and the valve 22 is open. Or optionally, a hose 64, shown in dotted lines in FIG. 3, may be connected to the valve 21, and with the valve 22 closed and the valve 21 open, tap water or city water may be drawn through the hose 54 by the pump suction and discharged through the discharge or delivery conduit 26 to the first three-way valve 6.

The three-way valves 6 and 9 are shifted by means of solenoids 54 and 55 in respective solenoid circuits 56 and 57 connected across a source of electrical power 58, 59, to be hereinafter described. At the nozzle 11 of the hose 18, two push-buttons 60 and 61 are provided which are actuated to close respective pressure actuated switches 62 and 63 in the respective solenoid circuits 56, 57.

Unless one of the buttons 60 or 61 is held pushed in or in closed position, the pump 4 will deliver atmospheric temperature or tap water by way of the conduit 26 through the valve 6, in the valve position shown in FIG. 3, to pass by way of the conduit 8 through the valve 9, in valve position shown in FIG. 3, to the delivery conduit 27 into the reel and hose. The nozzle 11 is of the type which can be adjusted for the delivery of water in the stream or intensity desired.

Now, if the button 60 is pushed, the switch 62 is closed to actuate the solenoid 54 to shift the three-way valve 6 so that water from the pump 4 is delivered through the conduit 26 through the valve 6 into the water heater 5. As actuated, the solenoid 54 also closes a switch 65 which closes a heater circuit 67 including the calrod unit or heating resistance coils 66 within the heater 5. Thus heated water is delivered through the conduit 32 into the detergent mixer 7 as detergent, at a controlled rate, passes downwardly by gravity through the funnel or hopper 12 into the mixer 7. As the detergent mixer 7 is part of a closed fluid circuit, the force of the pump 4 is ample to force the mixed hot water and detergent, or hot soapy water, to unseat the check valve element, which is lightly urged seated in direction of the mixer 7. The soapy water may thus be delivered into the conduit 8 and on through the three-way valve 9 into the delivery conduit 27 to the reel and hose.

The slide valve 15, which may be a selectively perforated plate moved in degree by solenoid operation to control the rate at which the detergent 13 from the rack 14 shown in FIG. 1, is indicated in FIG. 3 by dotted line rectangular over the hopper 12 and mixer 7, and connected by a dotted line circuit 68 in series with the switch 65 and the calrod unit 66 within the water heater 5.

The switch to compressed air may be made as desired, the button 61 adjacent the hose nozzle 11 being pressed (the bottom 60 being released). When this occurs, the compressor 3 can run to draw in and compress air and deliver it through the compressed air conduit 29 and second three-way valve 9 into the delivery conduit 27, the solenoid 55 effectuating the valve switch as the pressure actuated switch 63 closes the solenoid circuit 57. In case it may be desired to heat the compressed air, a compressed air heater 69 may be provided in a series (or parallel) circuit with the winding of the solenoid 55.

The invention is adapted to carry out the mass washing of cars, as for instance, by contracting all of the automobiles of the tenants of apartment buildings having parking garages may be washed at selected intervals and as a service of the management. Also, the buses of a bus company, the vehicles in a parking lot or garage as an incident to parking, the vehicles at an airport, and of course, individual cars may be washed at residences, by individual order or on contract.

Because of the many and various usages, the motor trucks for carrying out the invention may drive their own pumps and compressors, as by the aforesaid power take-off shown in FIGS. 2 and 3 as provided in the left access passage 51 beside the water tank 24. Or optionally, the pump and compressor of a motor truck may have their motors plugged in to be driven from sources of electrical power at locations. Also a storage battery may be provided and apparatus driven or actuated by D.C. electricity 70, as indicated in FIG. 3, an ample storage battery being provided to the rear of the detergent box storage space or passage 71 to the right of the water tank 24 in FIG. 3.

Additionally, it should be noted that the hose 11 permits the operator a wide latitude of movement in addition to selective control of atmospheric temperature water, heated water mixed with detergent, or compressed air. And especially, as established in the parent application, the hose reel 10 is provided with a conventional means 72 to maintain some takeup tension on the hose 18, the tension not being enough in degree to cause any excess strain on the operator as he holds the free end of the hose in operation, but the tension provided being adequate to roll the hose 18 back up on the reel 10 after the hose is released at the end of use, or whenever released for any purpose.

The invention is adapted to a wide variety of usages at a wide range of locations, and can require variations in structures and apparatus other than that exemplarily disclosed, as long as no departure is made from the broad spirit and merited scope of the claimed invention. In effect, as the parent application states, although description has been given of "a preferred form of the invention, it should be understood that the same may be altered in details and in relative arrangement of parts within the scope of the appended claims."

What is claimed is:

1. In combination with a motor truck, portable car washing equipment carried thereby including a pump, an air compressor, a water heater, a detergent mixer, a hose reel having a reel axis, first and second three-way valves, electrical means for said heater and to selectively switch said three-way valves between respective first and second positions, means connecting said pump to a source of water, means connecting said electrical means to a source of electrical power, common driving means for said pump and said compressor, a hose nozzle, switch means actuable from the hose nozzle to selectively switch said valves, a discharge conduit connecting said pump to said first valve, a water heater-first valve connecting conduit, a water heater-detergent mixer connecting conduit, a second valve connecting conduit, a hose, said hose having an end fixed to said reel, delivery conduit means from said second valve to deliver fluid through the reel axle into the reel fixed end of said hose, a compressed air conduit to deliver compressed air from said compressor to said second valve, a detergent-mixer connecting conduit to said first valve connecting conduit and having a check valve therein yieldably urged seated in direction of said detergent mixer, whereby the truck may be transported to selective cars to be washed, electrical, water, and drive connections made, and cars washed at location, said first valve being actuated from said nozzle to selectively switch water delivery between said valve connecting conduit and said water-heater first valve connecting conduit, and said second valve being selectively actuated from said nozzle to switch said second valve between said valve connecting conduit and said compressed air connecting conduit.

2. The combination as claimed in claim 1 which additionally includes said source of water as a tank installed on said truck.

3. The combination as claimed in claim 1 which additionally includes means to heat the compressed air actuated upon the switching of said second three-way valve to pass compressed air.

4. The combination as claimed in claim 1 which additionally includes a slide valve means to control detergent delivery into said mixer actuated upon the switching of said first three-way valve to divert water to said water heater.

5. The combination as claimed in claim 1 in which said means connecting said pump to a source of water comprises a flexible hose from said pump when said source of water comprises a water outlet at car washing location.

6. The combination as claimed in claim 1 which additionally includes a power take-off on said truck, and operated by the engine of said truck when the truck is stopped, as the common means to drive said pump and said compressor.

7. The combination as claimed in claim 1 in which the means connecting said pump and said compressor to be driven comprise respective electric conductor cords extendable to a source of electrical power at location.

8. The combination as claimed in claim 1 in which said electrical means for said heater and to selectively switch said three-way valves includes an electric storage battery carried by said truck as a source of electrical power.

9. The combination as claimed in claim 1 in which said means actuable from the hose nozzle to selectively switch said valves comprises respective solenoids for said valves.

References Cited by the Examiner

UNITED STATES PATENTS

| 3,058,668 | 10/1962 | Harmes et al. | 239—305 |
| 3,118,610 | 1/1964 | Techler | 239—305 |
| 3,163,880 | 1/1965 | Johnson | 239—130 |
| 3,243,123 | 3/1966 | Inghram et al. | 239—130 |

EVERETT W. KIRBY, *Primary Examiner.*